UNITED STATES PATENT OFFICE.

WILLIAM B. DAVIS, OF NEWPORT, NEW YORK.

TANNER'S OIL.

SPECIFICATION forming part of Letters Patent No. 449,437, dated March 31, 1891.

Application filed May 27, 1890. Renewed March 2, 1891. Serial No. 383,377. (No specimens.)

*To all whom it may concern:*

Be it known that I, WILLIAM B. DAVIS, a citizen of the United States, residing at Newport, in the county of Herkimer and State of New York, have invented certain new and useful Improvements in Tanner's Oil; and I do declare the following to be a full, clear, and exact description of the invention, such as will enable others skilled in the art to which it appertains to make and use the same.

My invention is a composition of ingredients constituting or producing a tanner's oil of superior quality which can be applied to the skins or leather and will render them soft, smooth, and flexible, and prevent them from cracking, and which can be produced at a small cost.

The oil, broadly stated, consists of stearine, tallow, raw linseed-oil, oil of citronella, and salicylic acid, which are mixed together to form a liquid which is applied in any suitable and convenient manner to the skins or leather.

In preparing the oil I use about the following proportion of the several ingredients: forty gallons of stearine, five gallons of tallow, five gallons of raw linseed-oil, two ounces of oil of citronella, and two drams of salicylic acid. These ingredients are placed in a suitable vessel and stirred or mixed thoroughly, and produce an oil of superior quality for tanners' use, which is applied in any suitable manner to the skins or leather, which renders them smooth, soft, and flexible, prevents cracking, and can be produced at a small cost, thus possessing the desired features of merit calculated to commend it as practical and useful for the desired purpose.

Having thus fully described my superior oil, the manner of compounding and applying it, and the advantages which it possesses, I claim as my invention—

The tanner's oil herein described and shown, consisting of stearine, tallow, raw linseed-oil, and oil of citronella in the proportions stated.

In testimony whereof I affix my signature in presence of two witnesses.

WILLIAM B. DAVIS.

Witnesses:
W. F. BRADY,
S. S. BOWEN.